US009842018B2

(12) United States Patent
Nam et al.

(10) Patent No.: US 9,842,018 B2
(45) Date of Patent: Dec. 12, 2017

(54) METHOD OF VERIFYING INTEGRITY OF PROGRAM USING HASH

(71) Applicant: INKA ENTWORKS, INC., Seoul (KR)

(72) Inventors: Jae Min Nam, Seoul (KR); Jung Geun Park, Gyeonggi-do (KR); Jun Ho Hong, Gyeonggi-do (KR); Jun Seok Oh, Seoul (KR); Jung Soo Kim, Seoul (KR)

(73) Assignee: INKA ENTWORKS, INC., Seoul (KR)

( * ) Notice: Subject to any disclaimer, the term of this patent is extended or adjusted under 35 U.S.C. 154(b) by 78 days.

(21) Appl. No.: 15/024,635

(22) PCT Filed: Sep. 3, 2014

(86) PCT No.: PCT/KR2014/008257
§ 371 (c)(1),
(2) Date: Mar. 24, 2016

(87) PCT Pub. No.: WO2015/046775
PCT Pub. Date: Apr. 2, 2015

(65) Prior Publication Data
US 2016/0239364 A1    Aug. 18, 2016

(30) Foreign Application Priority Data
Sep. 27, 2013 (KR) .......................... 10-2013-0115631

(51) Int. Cl.
*H04L 1/00* (2006.01)
*G06F 11/00* (2006.01)
(Continued)

(52) U.S. Cl.
CPC ........ *G06F 11/079* (2013.01); *G06F 11/0727* (2013.01); *G06F 11/0751* (2013.01); *G06F 11/3604* (2013.01)

(58) Field of Classification Search
CPC ... H04L 1/0041; H04L 43/0823; H04L 47/32; H04L 65/064; H04L 67/10; H04L 43/14; H04L 9/3239; H04N 21/235; G06F 21/64
See application file for complete search history.

(56) References Cited

U.S. PATENT DOCUMENTS 8,874,927 B2    10/2014   Park
2005/0234908 A1*  10/2005  Lowrance ............... G06F 21/64
(Continued)

FOREIGN PATENT DOCUMENTS

KR   10-2009-0093187      9/2009
KR   10-2009-0115544      11/2009
(Continued)

OTHER PUBLICATIONS

International Search Report for PCT/KR2014/008257, dated Dec. 12, 2014, 4 pages.
(Continued)

*Primary Examiner* — Christine Tu
(74) *Attorney, Agent, or Firm* — Nixon & Vanderhye P.C.

(57) ABSTRACT

In a method for verifying the integrity of first to Nth binaries (N is a natural number greater than or equal to 2), the method may comprise: loading the first to Nth binaries into a main memory in order to execute the binaries; verifying a self hash to verify, by the Kth binary (K=1, . . . , N−1) which has been loaded into the main memory, the integrity thereof by using a hash; and verifying a link hash by setting any one of the first to Kth binaries as a verification binary and setting a (K+1)th binary to be loaded into the main memory as a
(Continued)

binary to be verified so that the verification binary verifies the integrity of the binary to be verified by using a hash.

20 Claims, 7 Drawing Sheets

(51) Int. Cl.
*G06F 11/07* (2006.01)
*G06F 11/36* (2006.01)

(56) References Cited

U.S. PATENT DOCUMENTS

| | | | | |
|---|---|---|---|---|
| 2011/0182422 | A1* | 7/2011 | Anderson | G06F 21/64 380/30 |
| 2013/0124871 | A1 | 5/2013 | Park | |
| 2016/0191243 | A1* | 6/2016 | Manning | H04L 9/32 713/168 |
| 2016/0380771 | A1* | 12/2016 | Pepin | G06F 21/44 713/187 |

FOREIGN PATENT DOCUMENTS

| | | |
|---|---|---|
| KR | 10-2012-0110660 | 10/2012 |
| KR | 10-2013-0053179 | 5/2013 |

OTHER PUBLICATIONS

Written Opinion of the ISA for PCT/KR2014/008257, dated Dec. 12, 2014, 4 pages.

\* cited by examiner

METHOD OF VERIFYING INTEGRITY OF PROGRAM USING HASH

This application is the U.S. national phase of International Application No. PCT/KR2014/008257 filed 3 Sep. 2014, which designated the U.S. and claims priority to KR Patent Application No. 10-2013-0115631 filed 27 Sep. 2013, the entire contents of each of which are hereby incorporated by reference.

BACKGROUND OF THE INVENTION

Field of the Invention

The present invention relates to a method for verifying the integrity of a program using a hash.

Description of the Related Art

It should be noted that the contents described below simply provide background information related to embodiments of the present invention and does not constitute a prior art.

A hash code is an output bit string of a Hash Function. Since a unique hash code is extracted according to an input value of the hash function, the input of a binary file into the hash function enables a hash code unique to each binary file to be extracted. Therefore, if a hash is applied to a binary file, a hash code may be referred to as a digital fingerprint of the binary file which is an input value of the hash function.

If there is a difference of even one bit in the contents of two binary files which are desired to be compared with each other, different hash codes are output respectively. In case of using this point, although an original file is not compared with all of compared files, the comparison of a hash code of the original file with hash codes of the compared files makes it possible to determine whether a file has been altered. In addition, in order to verify whether the file has been altered, the content of the original file is not required to be stored and only the hash code of the original is required to be stored. Therefore, the verification is simple and the hash code is easily and conveniently stored and is not easily exposed to a person who desires to attack a program.

A file hash method is generally used to verify the integrity of a file. However, when there are a plurality of binary files of a program which are verified, methods for verifying the plurality of binary files provide different efficiency and security. A program may be constituted by one binary file but, when a dynamic library is used, a plurality of binary files may constitute one program. Further, integrity verification may be required between a plurality of application programs.

When a program includes multiple binary files, there are various verification methods for guaranteeing the integrity by using a hash. However, such methods do not consider a time point of verifying a hash which is verified. One method, conveniently used, for verifying the integrity of multiple binary files is to verify, by any one of a plurality of binary files constituting a program, file hashes of the remaining binary files. Another method is to arrange a plurality of binaries constituting a program in a circulating form and verify, by each binary, file hashes of binaries adjacent to both sides thereof.

The method for verifying, by any one binary file of a program including a plurality of binaries, file hashes of the remaining binary files has a simple structure, in which one binary verifies the integrity of other binary files, and therefore can be easily developed. However, the method has security vulnerability in that, when a code which verifies a hash, is exposed, the hash verification of all files can be invalidated by a simple code change.

The method for arranging a plurality of binaries constituting a program in a circulating form and verifying, by each binary, file hashes of binaries adjacent to both sides thereof provides more improved security than the first method in that since two binaries verify each other, it is difficult to determine the location of a code which verifies a file hash and even when hash verification codes of some binary files is exposed and invalidated, it is possible to verify the integrity of other remaining files. However, the other remaining files are verified not before a program file is loaded but when the program file is loaded, and the method depends on the time point of loading of the other remaining files. As a result, the method may not be a fundamental solution in that a time gap hole due to order is generated.

SUMMARY OF THE INVENTION

Embodiments of the present invention provides a method for verifying the integrity of multiple binary files included in a program against each other or the integrity of a plurality of programs against each other.

According to one aspect of this embodiment, In a method for verifying the integrity of first to Nth binaries (N is a natural number greater than or equal to 2), the method may comprise: loading the first to Nth binaries into a main memory in order to execute the binaries; verifying a self hash to verify, by the Kth binary (K=1, ..., N−1) which has been loaded into the main memory, the integrity thereof by using a hash; and verifying a link hash by setting any one of the first to Kth binaries as a verification binary and setting a (K+1)th binary to be loaded into the main memory as a binary to be verified so that the verification binary verifies the integrity of the binary to be verified by using a hash.

According to another aspect of this embodiment, in a method for verifying the integrity of first to Nth script files (N is a natural number greater than or equal to 2), the method may comprise: sequentially calling the first to Nth scripts in order to execute the scripts; verifying a self hash to verify, by the called Kth script (K=1, ..., N−1), the integrity of thereof by using a hash; and verifying a link hash by setting any one of the first to Kth scripts as a verification script and setting a (K+1)th script to be called as a script to be verified so that the verification script verifies the integrity of the script to be verified by using a hash.

According to yet another aspect of this embodiment, in a device for verifying the integrity of first to Nth binaries (N is a natural number greater than or equal to 2), the device may comprise: an auxiliary memory unit configured to store the first to Nth binaries; a main memory configured to sequentially load the first to Nth binaries in order to execute the binaries; a self hash verification unit connected to the auxiliary memory unit and the main memory and configured to verify, by a Kth binary (K=1, ..., N−1) which has been loaded into the main memory, the integrity thereof by using a hash; and a link hash verification unit connected to the auxiliary memory unit and the main memory and configured to set any one of the first to Kth binaries loaded into the main memory as a verification binary and set a (K+1)th binary to be loaded into the main memory as a binary to be verified so that the verification binary verifies the integrity of the binary to be verified by using a hash.

According to yet another aspect of this embodiment, in a method for verifying the integrity of first to Nth binaries (N is a natural number greater than or equal to 2), the method may comprise: loading a Kth binary (K=1, N) among the first to Nth binaries into a main memory in order to execute the Kth binary; verifying a self hash to verify, by the Kth binary loaded into the main memory, the integrity thereof by using a hash; and when an unverified binary, the integrity of which has not been verified, is called while the loaded binaries are operated, verifying a link hash by setting a calling binary as a verification binary and setting the unverified binary to be loaded into the main memory as a binary to be verified so that the verification binary verifies the integrity of the binary to be verified by using a hash and, when the integrity is verified, returns to the loading step.

As described above, according to embodiments of the present invention, when verifying the integrity of multiple binary files included in a program against each other or the integrity of a plurality of programs against each other, a use of a link hash verification method mixed with a self hash verification method can minimize a time gap between the loading of a binary and the verification of the binary by verifying the integrity before and after a time point when the binary is loaded, thereby increasing the validity of integrity verification. In the link hash verification method, depending on an order in which binaries are loaded into a main memory in order to execute a binary file, a binary previously loaded into the main memory verifies the integrity of a binary which is about to be loaded into the main memory. In the self hash verification method, a binary is loaded into the main memory for the execution thereof and then immediately verifies the integrity of a file thereof. Further, in case of the link hash verification method, since a binary does not performs integrity verification in a file thereof, it is difficult to know a location at which the binary verifies integrity, and, even when a self hash verification code is exposed and invalidated by a static analysis tool, the verification can be repeatedly performed in other adjacent binaries. Therefore, the integrity of a file can be guaranteed.

Further, according to an embodiment of the present invention, when any one of multiple binaries constituting a program or a plurality of programs is loaded in violation of the order in which they are loaded into a main memory, a file is determined to have been altered and the program is ended. Further, a binary, which will perform security verification, is first loaded into the main memory, completes the security verification of a binary to be verified, and then immediately the binary to be verified is loaded into the main memory, thereby minimizing a hole according to time and increasing the validity of integrity verification. In case of trying to alter any one of the multiple binaries and load altered binary into the main memory, when a file stored in an auxiliary memory unit has been altered, it is possible to detect that the file has been altered in a link hash verification performed immediately before the binary is loaded into the main memory. Even when a person desiring to attack a program manipulates the program or alters the program in other ways and therefore an original function of link hash verification is not performed, it is possible to detect that the file has been altered, through the self hash verification performed immediately after the binary is loaded into the main memory. The above-described technical concept of the present invention can be applied to not only a program made in the form of a binary but also a program made in the form of a script.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EMBODIMENTS

Hereinafter, embodiments of the present invention will be described in detail with reference to accompanying drawings.

When an application program includes a dynamic library and thereby has a plurality of binaries, the application program may be altered by precluding a dynamic library, which is called by the application program, from performing an originally intended function, by performing a function which is not intended by a user (for example, acquiring a game item through automatically performing a game in a game program, performing transmission to a person whose credit information is unauthorized, or the like), or by attaching a new code, such as a virus, which causes harm. However, when a plurality of dynamic libraries are used, the prior art only verified whether a file had been altered and did not consider a time point of hash verification. Hereinafter, in an embodiment of the present invention, a description will be given on a method for guaranteeing the integrity of a file related to an application program and a dynamic library even when a plurality of dynamic libraries are used. Here, the dynamic library may be referred to as various names such as a Dynamic Link Library, a Shared Library, a Run Time Library, a Active X control, and the like.

However, the technical concept of the present invention is not limited a plurality of binaries which include a dynamic library. The technical concept of the present invention may also be applied between a plurality of application programs. Therefore, a first binary, which is firstly loaded into a main memory, among binaries included in first and second applications, may perform self hash verification and perform link hash verification of a second binary which is secondly loaded into the main memory, and the second binary may perform self hash verification immediately after being loaded into the main memory. Further the technical concept of the present invention is not limited to a program converted in the form of a binary. The technical concept is capable of being similarly applied to a program made by a script language such as a JavaScript or a VB script. When a program including a plurality of JavaScripts is executed, a jscript1.js firstly executed performs self hash verification thereof and performs link hash verification of a secondly executed jscript2.js. The jscript2.js, in addition, performs self hash verification. Therefore, a binary set forth in claims should be construed to include a program, etc. Hereinafter, the description of embodiments will be focused on an application program which includes a dynamic library.

Figure 1:
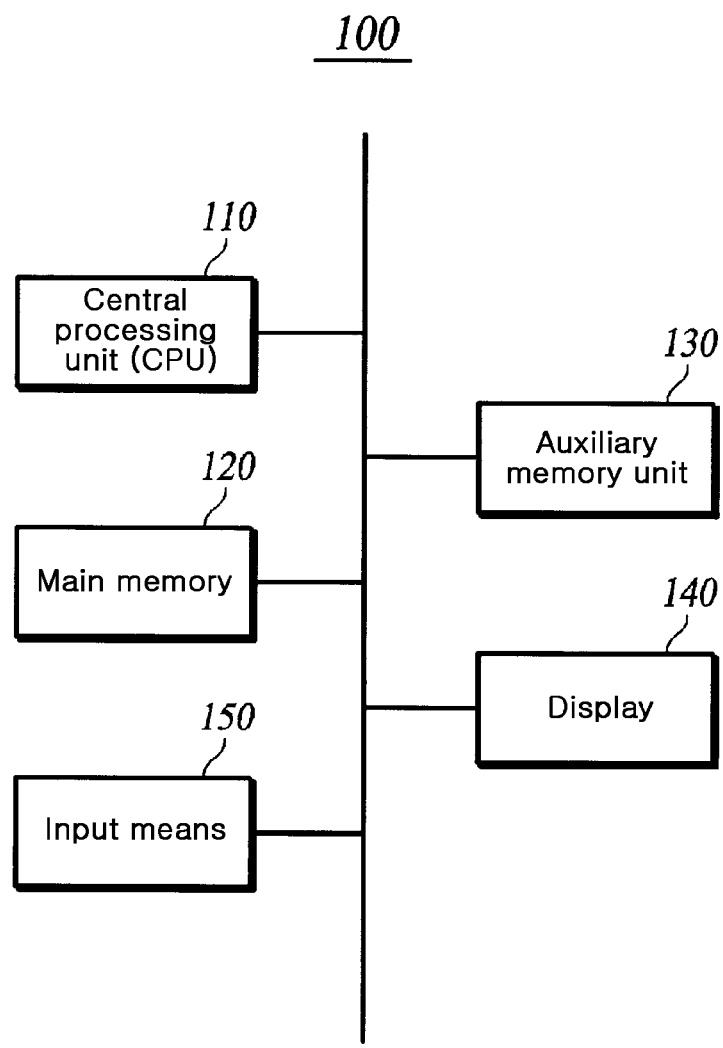
FIG. 1 is an exemplary view of a computer device for executing a program which includes multiple binaries.

FIG. 1 is an exemplary view of a computer device for executing a program including multiple binaries.

An application program and a dynamic library stored in an auxiliary memory unit 130 are loaded into a main memory 120 and the application program is executed by a central processing unit (CPU) 110. The application program receives data necessary for the execution thereof from an input device 150 and outputs a result of the execution in a display device 140. The application program loaded into the main memory 120 loads the dynamic library necessary therefor from the auxiliary memory unit 130 to use the dynamic library. When the application program is executed, a binary file including a start point of the application program is firstly loaded into the main memory 120 and is executed. While the application program is executed, when a particular module is required to be called, the dynamic library is loaded from the auxiliary memory unit 130 into the main memory 120.

Figure 2:
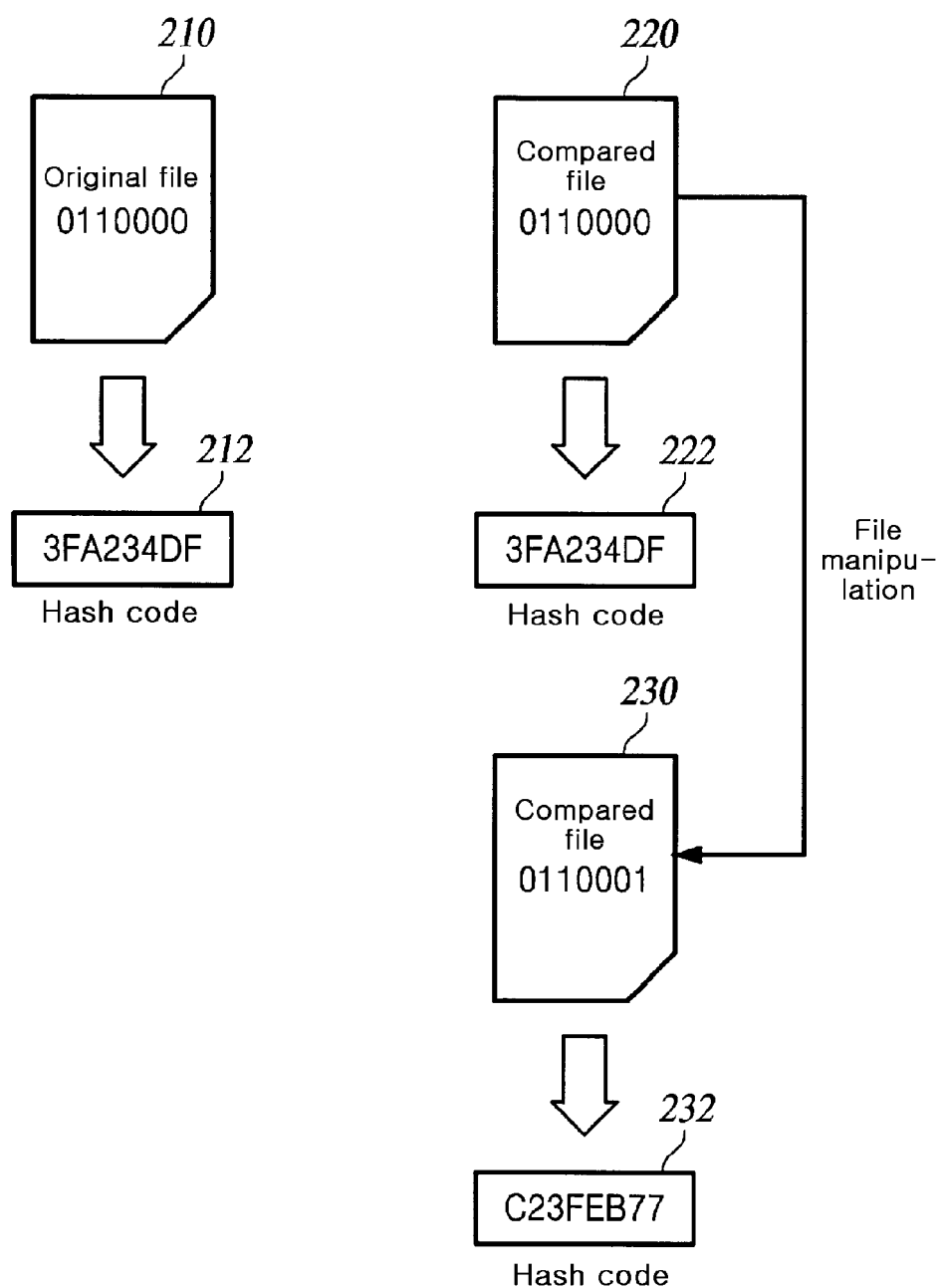
FIG. 2 is a schematic view of a method for verifying the integrity of a file by using a file hash.

FIG. 2 is a schematic view of a method for verifying the integrity of a file by using a file hash.

In order to verify the integrity of a file by using a file hash, first of all, an original file 210 is input to a Hash Function (MD5, SHA, Checksum, etc.) to extract a hash code 212 of the original file. The hash code 212 of the original file should be stored in advance in order to compare, later on, the hash code 212 of the original file with a hash code 222 extracted from a compared file 220. While preventing the hash code 212 of the original file from being exposed to a person attacking a program, the hash code 212 of the original file and the compared file 220 are distributed. If a compared file 230 is executed in a user system, the hash code 222 of the compared file is extracted and compared with the hash code 212 of the original file, so that whether the compared file 220 has been altered can be determined.

In FIG. 2, the contents of the original file 210 are shown as "0110000". The compared file 220, which has the same content as the original file 210, is distributed to a user together with the hash code 212 of the original file. At this time, the two files have the same hash code, "3FA23DF" because the two files have the same contents.

However, after being distributed, when the compared file 230 is altered and the contents thereof are altered to "0110001", and the altered compared file 230 is executed, then a hash code 232 extracted from the altered compared file 230 becomes "C23FEB77". Since the hash code 232 of the compared file does not match the hash code 212 of the original file, it is possible to detect that the compared file 230 has been altered.

Figure 3:
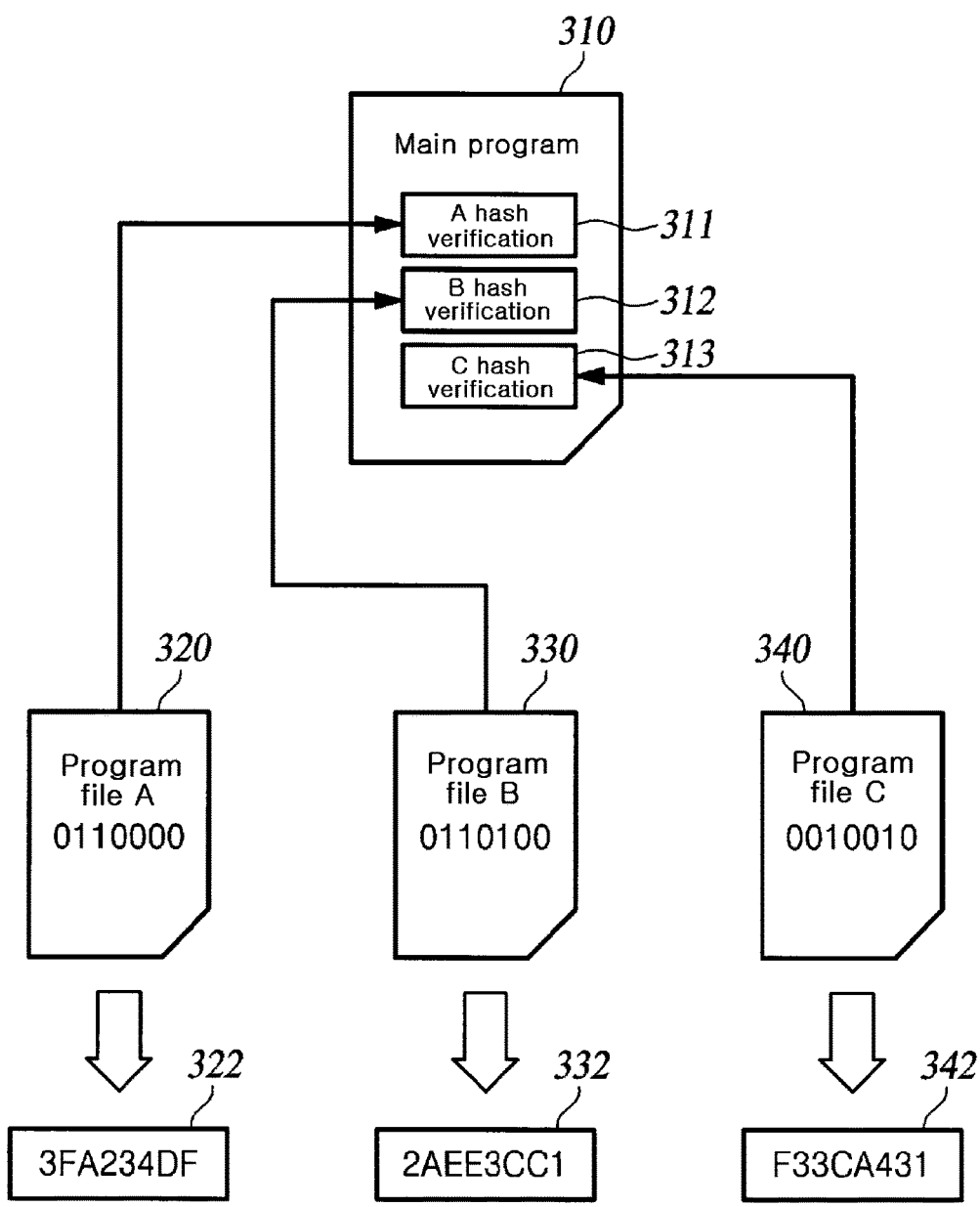
FIG. 3 is an exemplary view of a method for verifying, by any one of a plurality of binaries, the integrity of the remaining binaries.

FIG. 3 is an exemplary view of a prior art for verifying, by any one of a plurality of binaries, the integrity of the remaining binaries.

FIG. 3 illustrates an example of a method for verifying, by any one of a plurality of binaries included in a program, whether the remaining binaries have been altered, by using a file hash. In FIG. 3, among the plurality of binaries included in the program, a main program 310 verifies the integrity of a program file A 320, a program file B 330, and a program file C 340. The hash code 322 of the program file A is "3FA234DF", the hash code 332 of the program file B is "2FEE3CC1", and the hash code 342 of the program file C is "F33CA431". While being executed, the main program 310 loads the program file A 320, the program file B 330, or the program file 340 into the main memory 120. In order to verify whether a binary file has been altered while loading the binary file, the main program 310 extracts a hash code of a file to be loaded and verifies whether a hash code, which matches the extracted hash code, exists in a hash registry which includes pre-stored hash codes. If there is no hash code which matches the extracted hash code in the hash registry, the file is determined to have been altered. Therefore, the main program 310 may take a measure, such as stopping the program execution.

However, the above-described method has security vulnerability in that if a code, which is included in the main program 310 performing verification and performs verification, is invalidated, verification of all binaries is invalidated.

Figure 4:
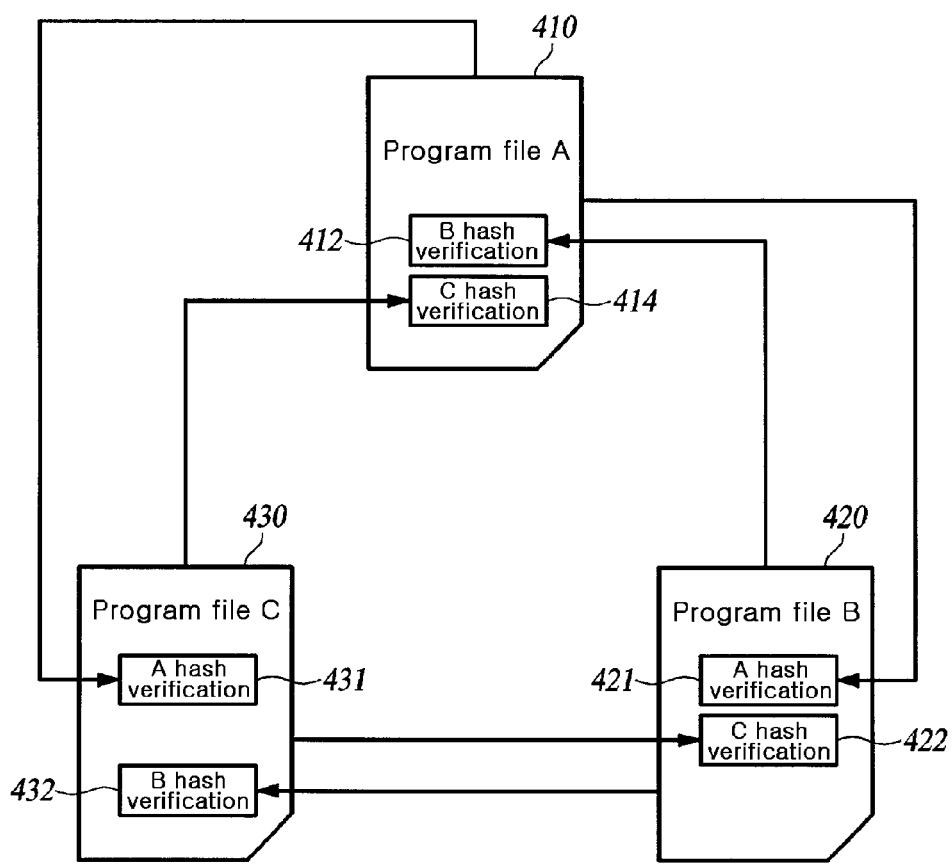
FIG. 4 is an exemplary view of a method for arranging a plurality of binaries in a circulating form and verifying, by each binary, file hashes of binaries adjacent to the both sides thereof.

FIG. 4 is an exemplary view of a method for arranging a plurality of binaries in a circulating form and verifying, by each binary, file hashes of binaries adjacent to the both sides thereof.

FIG. 4 illustrates an example of a prior link hash verification art for arranging a program file A 410, a program file B 420, and a program file C 430, which are binary files constituting an application program, in a circulating form and verifying, by each binary, file hashes of two binaries adjacent to the both sides thereof. If the application program is executed, the program file A 410 is firstly loaded into the main memory 120. After being loaded into the main memory 120, the program file A 410 performs hash verification 412 on the program file B and hash verification 414 on the program file C. After being loaded into the main memory 120, the program file B 420 also performs, in the same manner, hash verification 421 on the program file A and hash verification 422 on the program file C, and the program file C 430 also performs, in the same manner, hash verification 431 on the program file A and hash verification 432 on the program file B.

The method, as described in FIG. 4, which verifies each other of files while rotating among files, may provide more improved security than the prior art described in FIG. 3, since, even when a code performing verification in some binaries is invalidated, verification of the remaining binaries is valid. This method provides excellent security. However, this method is not to verify a program file before the program file is loaded but to verify other files at a time point when the file is loaded, thus this method depends on a time point when the other files are loaded. Therefore, a time gap hole due to an order is generated. For example, assuming that, since the program file C 430 loaded at last is late loaded, the program file C 430 is loaded 5 seconds after the program file A 410 and the program file B 420 are loaded, then a hole during which an attack can be made is generated for 5 seconds from the time hash verification has been performed on the program file C 430 up to the time the program file C 430 is loaded into the main memory 120. Therefore, in case of the program file C 430, the validity of integrity verification may be considered to be low.

Figure 5:
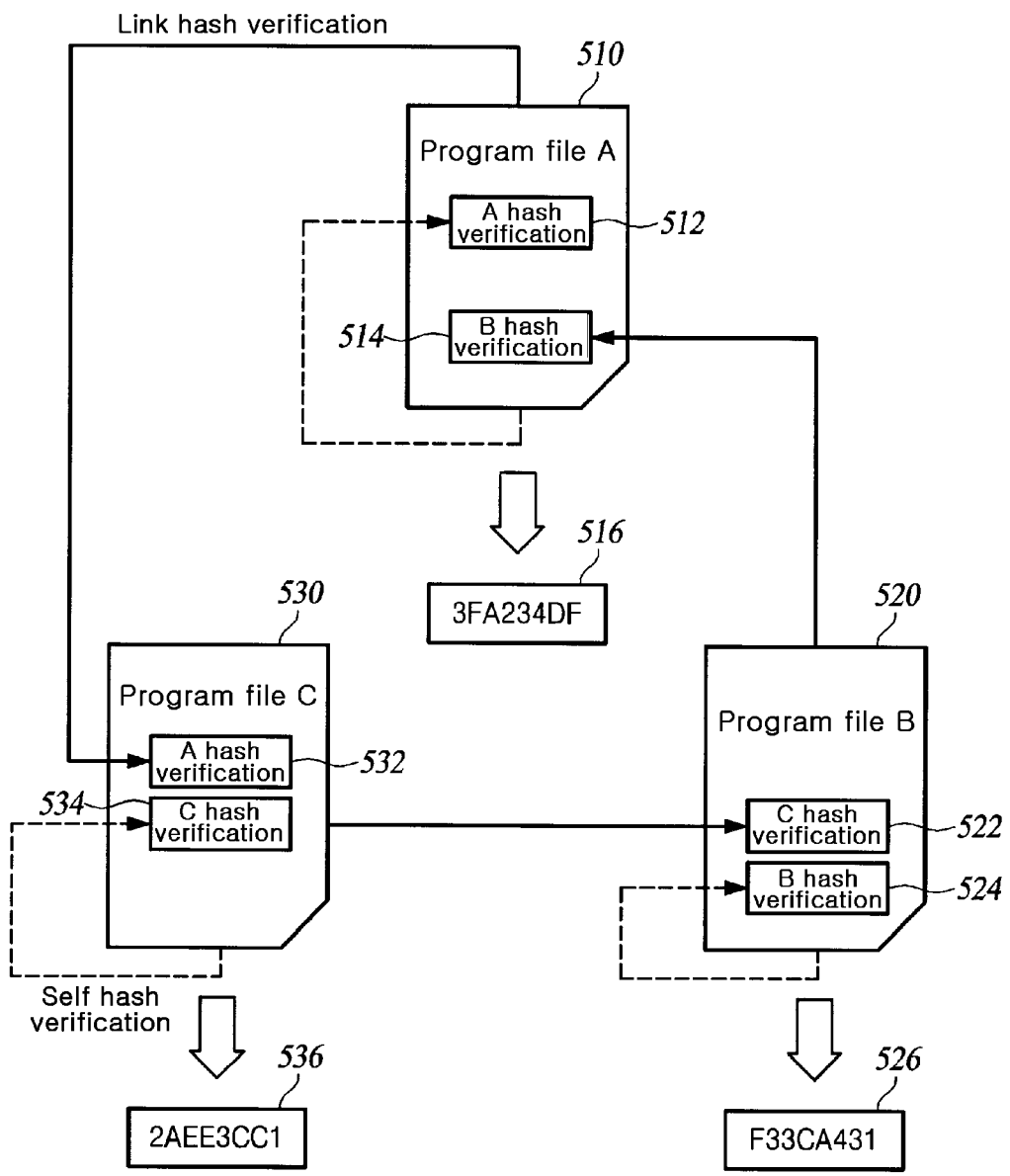
FIG. 5 is an exemplary view of a method for verifying multiple binaries by using link hash verification and self hash verification according to an embodiment of the present invention.

FIG. 5 is an exemplary view of a method for verifying multiple binaries by using link hash verification and self hash verification according to an embodiment of the present invention.

FIG. 5 illustrates an example of a method for overcoming a security hole, which is a problem of the prior art, by combining a link hash verification method and a self hash verification method in verifying the integrity of a plurality of binary files included in a program. In FIG. 5, among a program file A 510, a program file B 520, and a program file C 530 included in an application program, the program file A 510 is firstly loaded into the main memory 120.

Hereinafter, the self hash verification and the link hash verification will be described. Immediately after being loaded into the main memory 120, the program file A 510 performs hash verification on a self binary file. This is referred to as self hash verification. The program file A 510 extracts a hash code 516 of its own file and performs hash verification 512 on itself to determine whether the extracted hash code 516 matches any one of hash codes included in a hash registry. If there is no matching value, the program file A 510 is determined to have been altered and the program is ended.

While the program file A 510 is being executed, a particular module included in the program file B 520 may be called. Here, immediately before program file B 520 is loaded, the program file A 510 performs hash verification 514 on the program file B. This is referred to as link hash verification. First, the program file A 510 extracts a hash code 526 of the program file B and determines whether the extracted hash code 526 matches any one of hash codes included in a hash registry. The program file A 510 becomes verification binary and the program file B 520 becomes a binary to be verified. The verification binary performs hash verification on the binary to be verified. If there is no hash code matching the hash code 526 of the program file B in the hash registry, the program file B 520 is determined to have been altered and the program is ended. Immediately after being loaded into the main memory 120, the program file B 520 performs self hash verification which is hash verification 524 on the program file B.

When the program file A 510 or the program file B 520 calls a particular module included in the program file C 530, the program file B 520 extracts a hash code 536 of the program file C and performs link hash verification which is hash verification 522 on the program file C; and, immediately after being loaded into the main memory 120, the program file C 530 extracts the hash code 536 thereof and performs self hash verification which is hash verification 534 on the program file C. Here, since the program file A 510 as well as the program file B 520 is loaded into the main memory 120 and is being operated, the program file A 510 may call the particular module included in the program file C 530. Such a method considers even an integrity verification time point according to program loading and thus may increase the validity of integrity verification. Generally, file hash verification is the most effective when being performed immediately before and immediately after a file is loaded. This is because the longer a verification time before or after loading time point, the longer a time during which an attack can made. This is, because for example, if a file hash is verified a few seconds after a file is loaded, it is difficult to guarantee the integrity of the file when a hacker alters a file before the file is loaded and replaces an original file with the altered file within a few seconds after the file is loaded. Therefore, the integrity verification is performed immediately before and immediately after a program is loaded.

If the program file C 530, which is a binary loaded at last into the main memory 120 while an application program is being executed, is set as a verification binary, the program file A, which is firstly loaded into the main memory 120 is set as a binary to be verified, the hash code 516 of the program file A is extracted, and link hash verification 532, which is hash verification on the program file A, is performed, then the link hash verification and self hash verification on all binaries is completed.

It is illustrated in FIG. 5 that the link hash verification is performed in rotation. However, this illustration is made in order to understand the concept of the present invention. Therefore, the link hash verification may not be performed on all programs, depending upon the design of program files.

Figure 6:
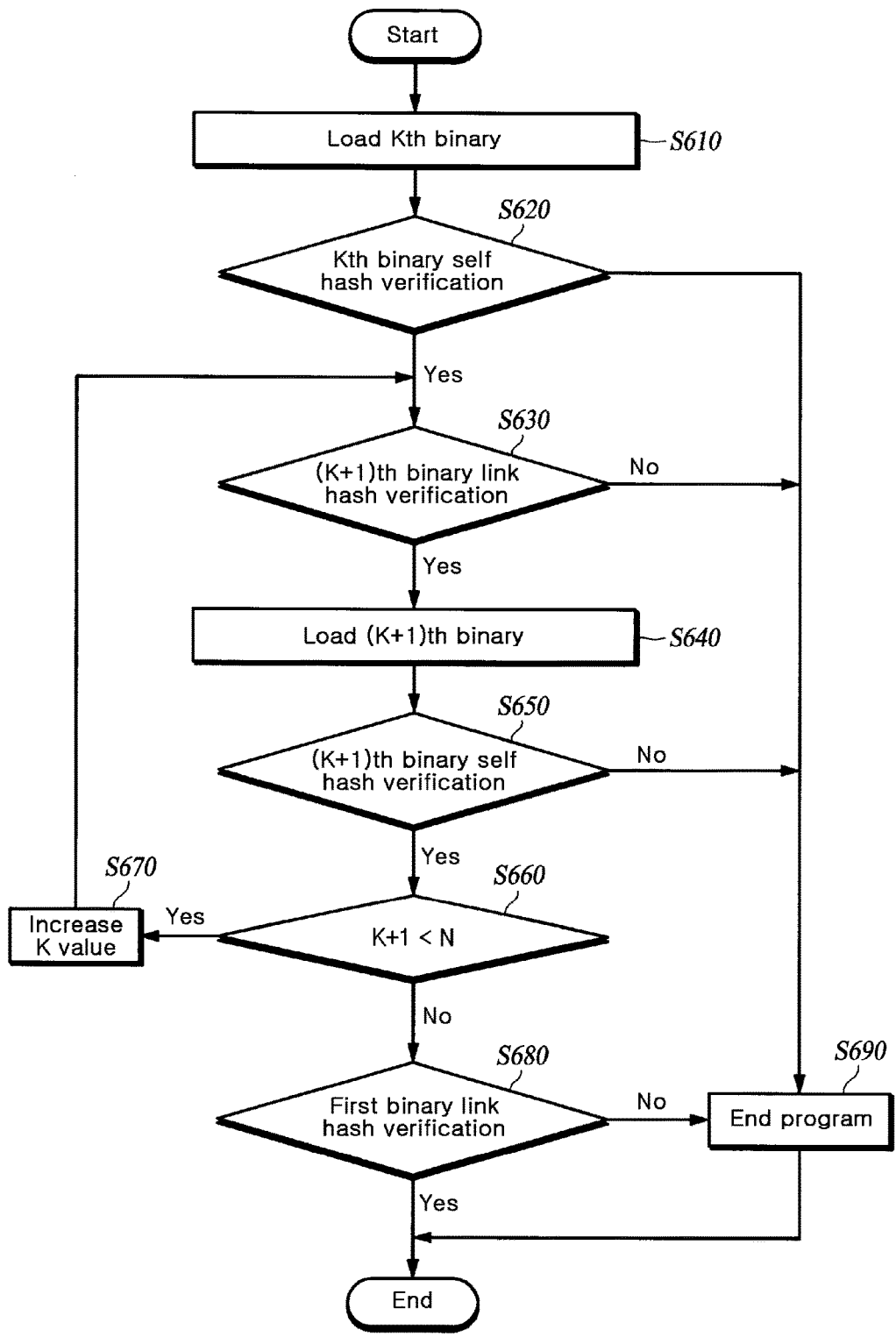
FIG. 6 is a flowchart which illustrates verifying the integrity of an application program according to an embodiment of the present invention.

FIG. 6 is a flowchart which illustrates verifying the integrity of an application program according to an embodiment of the present invention.

In verifying the integrity of an application program which includes N binaries, first to Nth binaries are sequentially loaded into the main memory 120 for the execution thereof. A Kth binary is loaded into the main memory 120 (S610) and self hash verification on the Kth binary is performed (S620). Here, K begins from 1. In the self hash verification, when a file is determined not to have been altered, the Kth binary verifies a link hash of a (K+1)th binary immediately before the (K+1)th binary is loaded into the main memory 120 (S630). Here, if the file is determined not to have been altered, the (K+1)th binary is loaded into the main memory 120 (S640). Immediately after being loaded into the main memory 120, the (K+1)th binary performs self hash verification thereon (S650). Further, if (K+1) is less than N when compared with N (S660), a K value increases by 1 (S670) and the process moves to a step of link hash verification on a binary to be loaded next (S630).

Further, if (K+1) becomes equal to N by repeatedly performing link hash verification on a binary to be loaded next into the main memory 120 and self hash verification after the binary is loaded into the main memory 120, the Nth binary loaded into the main memory 120 at last verifies a link hash of the first binary firstly loaded into the main memory 120 (S680). If, in the self hash verification and the link hash verification, a file is determined to have been altered, the program ends (S690).

In case of a program made by using a script, integrity may be verified in the same manner. In verifying the integrity of the program made by using N scripts, first to Nth scripts are sequentially called for the execution thereof. If a Kth script is called, the Kth script firstly verifies a self hash (K begins from 1). The Kth script verifies a link hash of a (K+1)th script to be called next. If the (K+1)th script is executed, self hash verification is firstly performed. Such a process is repeatedly performed whenever (K+1) is less than N. If (K+1) becomes equal to N, an Nth script performs self hash verification on itself and performs link hash verification on the first script.

Figure 7:
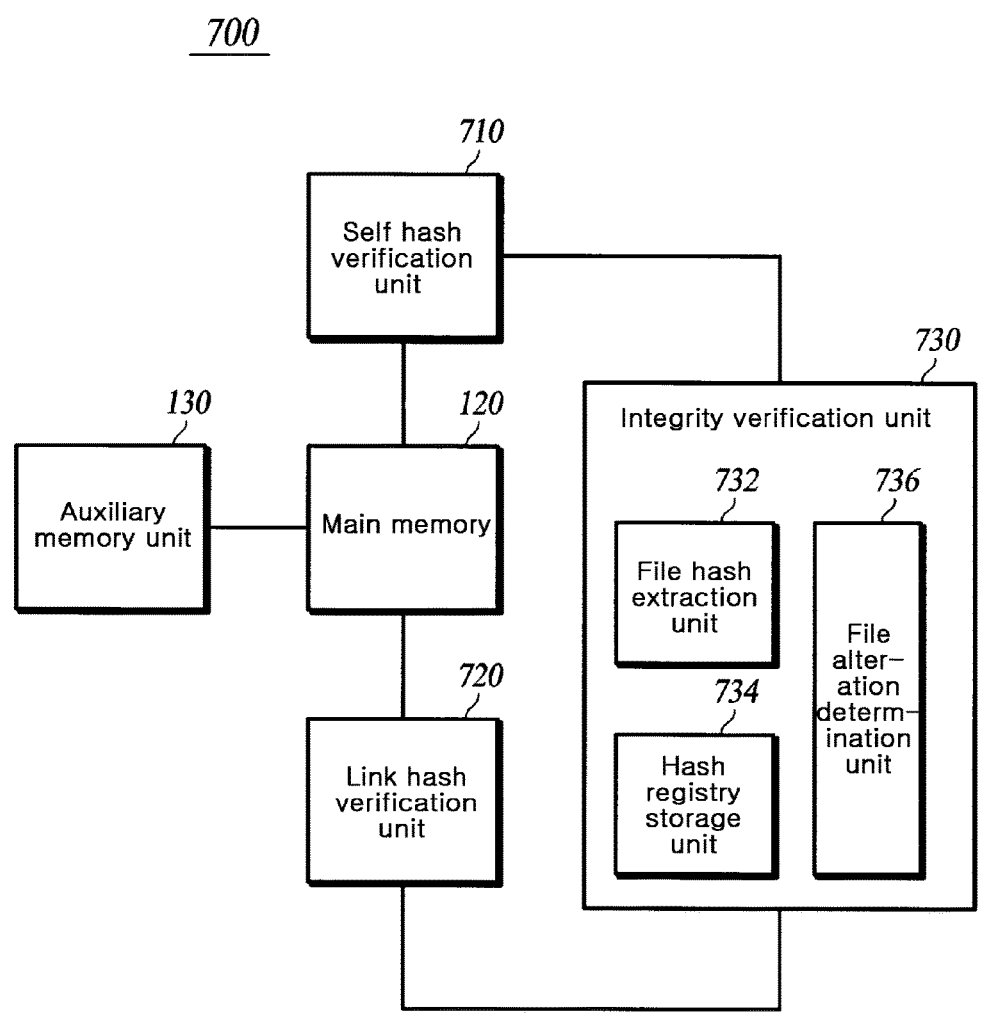
FIG. 7 is a configuration view of a device for verifying the integrity of an application program according to an embodiment of the present invention.

FIG. 7 is a configuration view of a device for verifying the integrity of an application program according to an embodiment of the present invention.

A device for verifying the integrity of an application program which includes a plurality of binaries comprises a main memory 120, an auxiliary memory unit 130, a self hash verification unit 710, a link hash verification unit 720, a integrity verification unit 730, a file hash extraction unit 732 in the integrity verification unit 730, a hash registry storage unit 734, and a file alteration determination unit 736.

The application program which includes the plurality of binaries is stored in the auxiliary memory unit 130, and then is loaded into the main memory 120 when the application program is executed. A binary loaded into the main memory verifies its own file hash by using the self hash verification unit 710 and the integrity verification unit 730 connected to the self hash verification unit 710. The file hash extraction unit 732 of the integrity verification unit 730 extracts a hash code of a binary received from the self hash verification unit 710 and transfers the hash code to the file alteration determination unit 736. The file alteration determination unit 736 determines whether the received hash code matches any one of hash codes stored in the hash registry storage unit 734, thereby determining whether a file has been altered.

The binary loaded into the main memory 120 performs link hash verification on a binary to be loaded next, by using the link hash verification unit 720. The link hash verification unit 720 transfers a binary file to be verified to the integrity verification unit 730 connected to the link hash verification unit 720 and verifies a file hash.

In the process of the self hash verification and the link hash verification, when the file alteration determination unit 736 determines that the file has been altered, the application program ends.

It is preferable that, in case of starting a program, the present invention is performed while program files are being loaded. However, the present invention may be applied while the program is being operated, depending upon the design of the program.

Device 700 for verifying the integrity of an application program according to an embodiment of the present invention may be a user terminal such as a personal computer (PC), a notebook computer, a tablet, a personal digital assistant (PDA), game console, a portable multimedia player (PMP), a PlayStation Portable (PSP), a wireless communication terminal, a smart phone, TV and a media player.

The device 700 for verifying the integrity of an application program according to an embodiment of the present invention may be a server terminal such as an application server and a service server. The device 700 for verifying the integrity of an application program according to an embodiment of the present invention may respectively refer to various devices provided with (i) a communication device such as a communication modem for performing communication with various devices or a wired/wireless communication network, (ii) a memory for storing data to execute the program, (iii) a microprocessor for performing computation and control by executing the program, and the like. In accordance with at least one embodiment, the memory may be a computer-readable recording/storage medium such as a Random Access Memory (RAM), a Read Only Memory (ROM), a flash memory, an optical disk, a magnetic disk, a solid state disk (SSD). In accordance with at least one embodiment, the microprocessor may be programmed to perform optionally at least one of operations and functions described herein. In accordance with at least one embodiment, the microprocessor may be implemented on the whole or on the part thereof by using hardware such as an application specific integrated circuit (ASIC) of a particular configuration.

The above description is simply to describe the technical concept of the embodiments by way of examples. Those skilled in the art of the embodiments may make various modifications, additions and substitutions, without departing from principles of this disclosure. Accordingly, the embodiments are intended for illustrating rather than for limiting the technical scope of this embodiment. The scope of the technical concept of the embodiments is not limited by the embodiments. The scope of the embodiment is to be interpreted by the following claims. All such modifications and variations are to be construed as being included within the scope of this embodiment.

What is claimed is:

1. A method for verifying the integrity of first to Nth binaries, wherein N is a natural number greater than or equal to 2, the method comprising:
    loading the first to Nth binaries into a main memory in order to execute the binaries;
    verifying a self hash to verify, by the Kth binary, wherein k=1, . . . , N−1, which has been loaded into the main memory, the integrity thereof by using a hash; and
    verifying a link hash by setting any one of the first to Kth binaries as a verification binary and setting a (K+1)th binary to be loaded into the main memory as a binary to be verified so that the verification binary verifies the integrity of the binary to be verified by using a hash.

2. The method according to claim 1, further comprising:
    verifying a self hash by the Nth binary after the Nth binary is loaded into the main memory, and verifying a link hash by setting any one of second to the Nth binaries as the verification binary and setting a first binary as the binary to be verified.

3. The method according to claim 1, in the verifying of the link hash, when the binary to be verified is the (K+1)th binary, the Kth binary is a verification binary.

4. The method according to claim 1, wherein the verifying of the self hash is performed by a binary loaded into the main memory immediately after the binary is loaded into the main memory.

5. The method according to claim 1, wherein the verifying of the link hash is performed by the verification binary immediately before the binary to be verified is loaded into the main memory.

6. The method according to claim 1, comprising
    reading hash registries for original binaries in order to verify the integrity of the first to Nth binaries.

7. The method according to claim 6, wherein the verifying of the self hash comprises:
    extracting a self file hash code by inputting the binary loaded into the main memory to a Hash Function;
    determining whether the extracted self file hash code matches any one of hash codes included in the hash registries; and
    stopping the execution of a program when a file is determined to have been altered.

8. The method according to claim 6, wherein the verifying of the link hash comprises:
    extracting a link file hash code of the binary to be verified by inputting the binary to be verified to a Hash Function;
    determining whether the extracted link file hash code matches any one of hash codes included in the hash registries; and
    stopping the execution of a program when a file is determined to have been altered.

9. The method according to claim 8, wherein the extracting of the link file hash code comprises
    acquiring, by the verification binary, information on whether any one of the first to Nth binaries except for the verification binary becomes the binary to be verified.

10. The method according to claim 1, wherein the verifying of the link hash comprises
    stopping the program execution when, except for the first binary, the verification binary is not loaded into the main memory but the binary to be verified is loaded into the main memory.

11. A method for verifying the integrity of first to Nth script files, wherein N is a natural number greater than or equal to 2, the method comprising:
    sequentially calling the first to Nth scripts in order to execute the scripts;
    verifying a self hash to verify, by the called Kth script, wherein k=1, . . . , N−1, the integrity thereof by using a hash; and
    verifying a link hash by setting any one of the first to Kth scripts as a verification script and setting a (K+1)th script to be called as a script to be verified so that the verification script verifies the integrity of the script to be verified by using a hash.

12. A device for verifying the integrity of first to Nth binaries (N is a natural number greater than or equal to 2), the device comprising:
- an auxiliary memory unit configured to store the first to Nth binaries;
- a main memory configured to load the first to Nth binaries in order to execute the binaries from the auxiliary memory unit;
- a self hash verification unit configured to verify, by a Kth binary (K=1, . . . , N−1) which has been loaded into the main memory, the integrity thereof by using a hash; and
- a link hash verification unit configured to set any one of the first to Kth binaries loaded into the main memory as a verification binary and set a (K+1)th binary to be loaded into the main memory as a binary to be verified so that the verification binary verifies the integrity of the binary to be verified by using a hash.

13. The device according to claim 12, wherein the link hash verification unit verifies a self hash by using the Nth binary after the Nth binary is loaded into the main memory, and verifies a link hash by setting any one of second to Nth binaries as the verification binary and setting a first binary as the binary to be verified.

14. The device according to claim 12, comprising
- a hash registry storage unit configured to store hash registries for original binaries in order to verify the integrity of the first to Nth binaries.

15. The device according to claim 14, wherein the self hash verification unit comprises:
- a self file hash extraction unit configured to extract a self file hash code by inputting the binary loaded into the main memory to a Hash Function;
- a file alteration determination unit configured to determine whether the hash code extracted by the self file hash extraction unit matches any one of hash codes included in the hash registries, and to stop the execution of a program when a file is determined to have been altered.

16. The device according to claim 14, wherein the link hash verification unit comprises:
- a link file hash extraction unit configured to input the binary to be verified to the Hash Function in the verification binary and extract a link file hash code; and
- a file alteration determination unit configured to determine whether the hash code extracted by the link file hash extraction unit matches any one of hash codes included in the hash registries, and configured to stop the execution of a program when a file is determined to have been altered.

17. A method for verifying the integrity of first to Nth binaries, wherein N is a natural number greater than or equal to 2, the method comprising:
- loading a Kth binary, wherein K=1, . . . , N, among the first to Nth binaries into a main memory in order to execute the Kth binary;
- verifying a self hash to verify, by the Kth binary loaded into the main memory, the integrity thereof by using a hash; and
- when an unverified binary, the integrity of which has not been verified, is called while the loaded binaries are operated, verifying a link hash by setting a calling binary as a verification binary and setting the unverified binary to be loaded into the main memory as a binary to be verified so that the verification binary verifies the integrity of the binary to be verified by using a hash and, when the integrity is verified, returns to the loading step.

18. The method according to claim 17, comprising
reading hash registries for original binaries in order to verify the integrity of the first to Nth binaries.

19. The method according to claim 18, wherein the verifying of the self hash comprises:
- extracting a self file hash code by inputting the binary loaded into the main memory to a Hash Function;
- determining whether the extracted self file hash code matches any one of hash codes included in the hash registries; and
- stopping the execution of a program when a file is determined to have been altered.

20. The method according to claim 18, wherein the verifying of the link hash comprises:
- extracting a link file hash code of the binary to be verified by inputting the binary to be verified to a Hash Function and;
- determining whether the extracted link file hash code matches any one of hash codes included in the hash registries; and
- stopping the execution of a program when a file is determined to have been altered.

* * * * *